Figure 1:
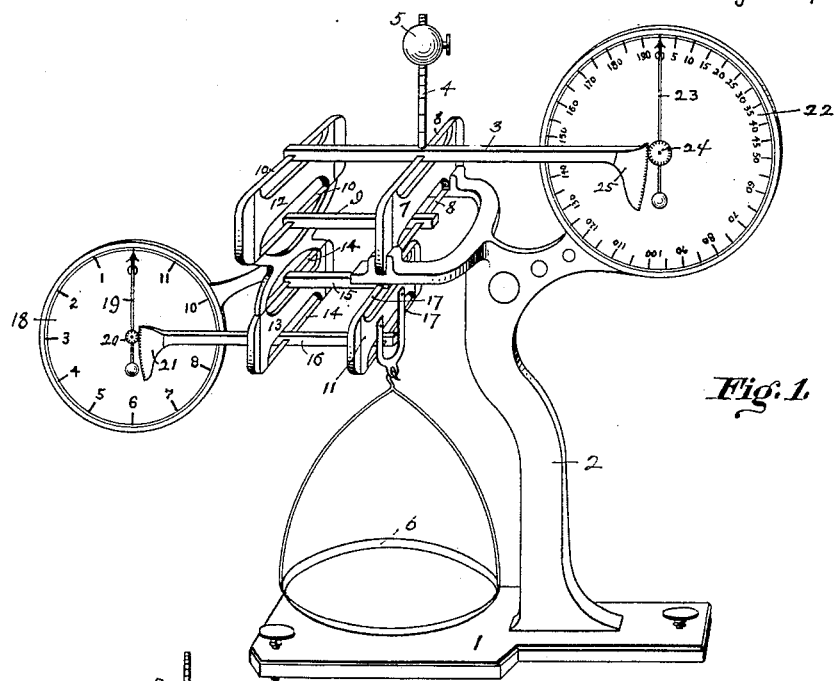

(No Model.)

A. SPRINGER & W. KENT.
WEIGHT AND PRICE INDICATING BALANCE.

No. 383,499. Patented May 29, 1888.

Attest.
C. W. Bogart.
E. L. ——

Inventors,
Alfred Springer,
William Kent,
By Hosea & Merrill,
Attys.

N. PETERS, Photo-Lithographer, Washington, D. C.

UNITED STATES PATENT OFFICE.

ALFRED SPRINGER, OF CINCINNATI, OHIO, AND WILLIAM KENT, OF PASSAIC, NEW JERSEY.

WEIGHT AND PRICE INDICATING BALANCE.

SPECIFICATION forming part of Letters Patent No. 383,499, dated May 29, 1888.

Application filed July 9, 1887. Serial No. 243,824. (No model.)

*To all whom it may concern:*

Be it known that we, ALFRED SPRINGER and WILLIAM KENT, citizens of the United States, residing, respectively, at Cincinnati, Ohio, and Passaic, New Jersey, have invented certain new and useful Improvements in Weighing and Price Indicating Balances, of which the following is a specification.

Our invention relates to weighing-balances, its object being to combine with the same mechanism for the automatic registration of price upon an adjustable basis of price per unit of weight, according to the number of units contained in the total mass of the substance weighed.

The underlying principle of our invention is most readily available in "molecular-pivot" balances—such, for example, as "torsion" or "flexion" balances—in which the center of gravity is normally above the center of rotation, which in torsion-balances is the axis of the fulcrum-pivot. In molecular-pivot balances the sensitiveness of the scale action increases as the center of gravity is elevated within the limits of such action, and this increase is in inverse correspondence with the pivotal resistance—*i.e.*, molecular resistance—of the pivots to beam deflection. As a means of compensating this molecular resistance, these balances are provided with a weight, usually denominated a "poise," mounted upon a rigid vertical standard upon the beam rising above the fulcrum-pivot, or otherwise so placed as to be resolvable into an equivalent of such construction and action. This construction and the law embodied therein has suggested to us a means of indicating total price upon an adjustable basis of price for unit of weight as a substitute for ordinary mental calculation. Thus, for example, since the effective action of a poise varies according to its vertical adjustment upon the supporting-standard in relation to the fulcrum-axis of the beam, we may graduate the standard into units of length representing distances from the fulcrum-axis for the adjustment of the poise. The balance being arranged to show a given permanent deflection of the beam (from the normal horizontal) for a given unit of weight in the scale-pan, the said limit of deflection is definitely governed by the vertical adjustment of the poise upon its standard—that is to say, the extent to which one pound, for example, would deflect the beam against the molecular resistance of its pivot or pivots would depend upon the position of the poise relatively to the fulcrum-axis. This is so because the standard is also deflected out of the normal perpendicular, and the statical moment of the poise increases in such deflection by adjustment upward from the fulcrum-axis. Thus it becomes possible to utilize the graduations upon the poise-standard as indications of serial price-units, and by providing suitable indicator-connections at the free end of the balance-beam the total price based upon the price-unit and the total of weight-units in the scale-pan may be indicated. The application of the principle, however, is not limited to particular classes of scales nor to the constructive form indicated in the foregoing statement. Thus it is a matter of convenience only to place the vertical poise above the fulcrum-axis. It may be placed below, in which case its statical moment would oppose the gravitating action of the substance weighed and diminish instead of increasing the deflection of the beam. The construction is applicable also to balances having "knife-edge" bearings, in which case, when placed above the fulcrum, a counter-weight would be required below, whose moment would tend slightly to keep the center of gravity below the center of rotation when the upper poise is at the upper limit of its adjustment. When placed below the fulcrum, its highest limit of adjustment should coincide with that position of the center of gravity below the fulcrum-axis, where it is still capable of restoring an equally-weighted scale-beam to its normal position.

The foregoing preliminary statement will indicate generally the nature of the principle which our invention utilizes and embodies. In the following specification we describe and illustrate its application to several selected forms of scales, and we may further premise that its further extension in this direction is a matter of mechanical skill only.

Drawings illustrating mechanism embodying our invention accompany this specification, and are referred to throughout the same by means of the reference-numerals.

Figures 2, 4:
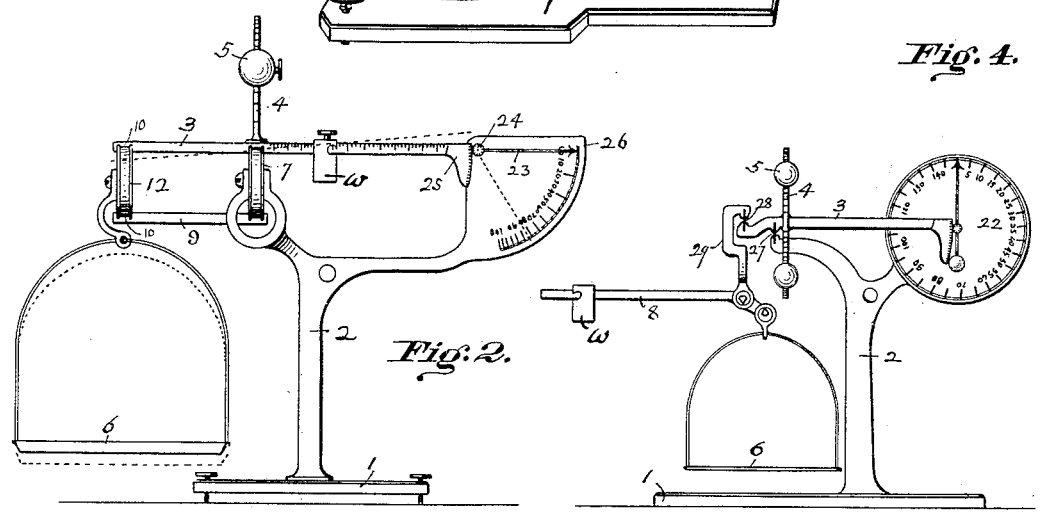
Figure 3:
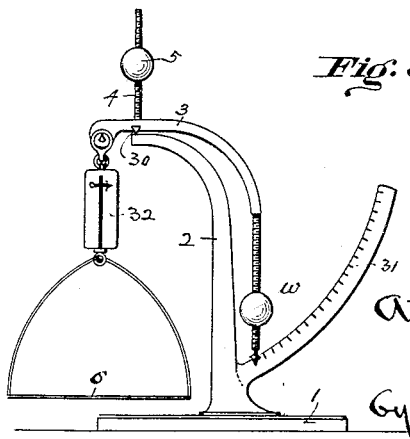

In the drawings, Figure 1 is a perspective elevation of a balance complete (such as referred to in the preliminary statement) in which our invention is embodied. Figs. 2, 3, and 4 are side elevations of balances embodying in various constructive forms the same principles.

Referring now to the drawings in aid of the description, the numeral 1 designates in all the figures the base or supporting-platform of the balance; 2, the supporting standard or pedestal on which the fulcrum-pivot is carried; 3, the principal balance-beam; 4, the poise-standard; 5, the poise, and 6 the scale-pan, these features being common to all the balances illustrated.

Figs. 1 and 2 represent torsion-balances, the pivots of which are endless bands of elastic metal tensioned peripherally upon suitable frames. The tension-frame 7, Fig. 1, is secured fixedly to the standard or pedestal 2, with its metal strip furnishing duplicate fulcrum-pivots 8 in the same vertical plane, to the upper one of which is secured the principal balance-beam 3, and to the lower one a parallel beam or "radius-bar," 9, the outer ends of these beams being united vertically by torsion-pivots 10, carried upon a tension-frame, 12.

Thus far the construction is substantially the same as a double-beam torsion-balance; but in this case the frame 12 is continued below or joined to a second similar frame, 13, having torsion-pivots 14. The frame 13 in turn is the relatively-fixed pivot-frame of a second balance system, with a radius-arm, 15, above and a balance-beam, 16, below, secured to the upper and lower pivots, 14, and terminally connected by a fourth tension-frame, 11, and pivots 17. From the latter frame is suspended the scale-pan 6. To the frames 12 13 (which may constitute a rigid single structure) is attached a dial, 18, having a graduated circle and a central rotating indicator or pointer, 19, with axial toothed pinion 20, meshing with the cogged sector or head 21 of the beam 16. A second dial, 22, is carried upon the fixed standard, 2, also provided with a graduated circle and with a pointer, 23, and an axial toothed pinion, 24, meshing with the toothed sector or head, 25, of the beam 3. The dial 18 is graduated in units-of-weight measure, as pounds and ounces, the standard 4 in units of price, as cents, and the dial 22 in amounts corresponding to multiplications of weight-measures by price-measures. If, now, a body is placed in the pan and the poise 5 adjusted vertically to the price-unit, the weight in units will be indicated upon the dial 18 and the total price upon the dial 22. The dial 22 may also be used for weight-indications and dial 18 dispensed with. Thus by adjusting the poise 5 to a certain price-unit, as ten cents, and placing weight in the scale-pan 6 sufficient to carry the pointer 23 to 10 on dial 22, the quantum of weight is then one pound. Double the weight, or two pounds, will carry the pointer to 20, and three pounds to 30, &c., so that the proper relation between weight and price is always maintained and indicated; or the weight being known and the price-unit marked by adjustment of the poise, the resultant product of multiplication or total price is indicated upon the dial.

It will be observed that the dead-weight in the scale-pan acts independently, first, upon the beam 16, and, second, as modified by the poise upon the main beam 3, the structure thus embodying two distinct yet co-operating systems of balances. In each, as will be obvious, the torsional resistance of the pivots is the force opposed to the load. In practice the leverage of the beam is made shorter at the load side of the fulcrums than as shown in the drawings, the parts being separated in the drawings for clearness of illustration.

In the torsion-balance shown in Fig. 2 the auxiliary balance system is omitted, the other parts remaining the same. Thus the frame 7 is mounted on the standard 2 and carries upon its pivots the beam 3 and radius-arm 9, connected terminally by the tension-frame 12 and its torsion-pivots 10. The scale-pan 6 is suspended from the frame 12. The extension of beam 3 to the right of the fulcrum-pivot is graduated and furnished with an adjustable rider or weight, $w$. The sector-head 25 of the main beam meshes with the axial pinion 24 of the pointer 23, which in this case moves across a tangent scale, 26, graduated with readings of total price. As thus constructed, the balance may be used as a price scale by adjusting the poise 5 to the indication of price per pound, placing the weight $w$ at $o$, and reading the total price upon the scale 26.

To use the balance for readings of weight and total price, the weight $w$, poise 5, and graduation should be so proportioned and arranged in due relation so that to indicate weight—say one pound, and total price at ten cents per pound—the poise 5 is placed at ten cents, rider $w$ at 1, and pointer 23 moves to 10; or, to indicate weight—say two pounds, price at five cents per pound—the poise 5 at five cents and rider $w$ at two pounds gives the reading 10 upon the scale 26. The principle of action in this case lies in the proper proportioning of the poise 5 and the graduations of the standard 4 with the rider $w$, and the graduations upon the scale-beam 3, whereby the function otherwise wholly performed by the poise 5 is modified by the rider $w$.

The illustration given in Fig. 4 is a flexion-pivot balance having the same general principle of action as that illustrated in Fig. 1. In this, however, the beam 3 is held above the standard 2 upon a flexion-pivot, 27. From the end of the beam 3 upon a flexion-pivot, 28, is suspended a hook, 29, carrying the balance-beam 8, from one end of which is hung the scale-pan 6 and upon the other the rider-weight w. The pivotal bearings of the balance beam and scale-pan may be ordinary knife-edges. The standard 4 and poise 5 upon the main beam 3 may be either above or below the fulcrum-pivot 27, or arranged both above and below, as in the drawings. The register 22 and the connections of its pointer with the beam 3 are as already described.

In Fig. 3 the same principles are embodied in a form of gravity-scale in which we introduce a knife-edge fulcrum, 30. The auxiliary balance system is replaced by a direct gravity spring-scale, 32, carrying the scale-pan 6, on which the dead-weight is indicated. The main beam 3 is bent downward at the right of the fulcrum and furnished with graduations and an adjustable weight, w. The poise 5 being adjustable to the price graduation, the extended arm of the beam 3 registers the total price on the arc 31. The remarks as to the action of the poise 5 and weight w in relation to Fig. 2 apply to the same parts shown in the present illustration.

In all the figures the distance between the fulcrum of the main beam and the point of scale-pan suspension is in practice much less than is here shown.

We claim as our invention and desire to secure by Letters Patent of the United States—

1. In a weighing-balance, the combination of a scale-beam having a pivotal resistance to deflection, a graduated vertical standard rigidly mounted thereon, an adjustable poise upon said standard opposing the pivotal resistance of the beam, and a registering device actuated by the beam oscillations to indicate total products of weight upon the beam terminal by the price-unit as fixed by the vertical adjustment of the resistance-counterpoise, substantially as set forth.

2. In a weighing-balance, the combination of a balance-beam having a pivotal resistance to deflection, a graduated vertical standard mounted rigidly thereon, a counterpoise to such pivotal resistance adjustable vertically on the standard, and a dial or indicating-register actuated by the beam's deflection as governed by the adjustment of the counterpoise, and an independent balance beam or weight-indicator suspended from the main balance-beam and carrying the weighed body, substantially as set forth.

3. The combination, in a weighing-balance, of a balance-beam, a fulcrum-pivot acting by molecular displacement and involving molecular resistance, a rigid vertical standard upon the beam graduated into definite spaces, and a counterpoise carried upon the standard and adjustable to the graduations, whereby the molecular resistance of the fulcrum-pivot is increased or diminished to exact degrees by the adjustment of the counterpoise, thereby regulating the limit of oscillation of the beam under a given weight for the purpose of ascertaining and indicating both weight and price at the same time, substantially as set forth.

4. In a weighing-balance, the combination of a base-frame or pedestal carrying an indicating-dial, a balance-beam carried upon the pedestal or frame by a molecular fulcrum-pivot and engaging the dial-finger at one end, a suspending-link carried by the opposite end of the balance-beam, an indicating-dial carried by said link, and an independent balance-beam fulcrumed upon and suspended by said link, engaging at one end the index finger of the last-mentioned dial and carrying at the other the weight-platform or scale-pan, substantially as set forth.

5. The combination, in a torsional balance, of the following instrumentalities, viz: a base frame or pedestal carrying a torsion-frame, a balance-beam carried upon one pivot of the frame, and a radius-arm upon the other, a double torsion-frame connecting the terminal of the balance-beam and radius-arm by two of its pivots, a second balance-beam and radius-arm carried upon the remaining pivots of a double torsion-frame, a third torsion-frame connecting the ends of the second balance-beam and its radius-arm and carrying the weight-platform, a graduated standard and poise adjustable thereon carried by the main balance-beam, a dial carried upon the pedestal with its index-finger in actuating engagement with the free end of the main balance-beam, and a second dial carried upon the double torsion-frame with its index-finger in actuating engagement with the free end of the second balance-beam, substantially as set forth.

In testimony that we claim the foregoing as our invention we have signed our names in presence of two subscribing witnesses.

ALFRED SPRINGER.
    WILLIAM KENT.

Witnesses:
 LOUIS C. RAEGENER,
 CARL KARP.